(12) United States Patent
Osawa et al.

(10) Patent No.: US 6,995,907 B2
(45) Date of Patent: Feb. 7, 2006

(54) DIFFUSION SHEET FOR USE IN TRANSMISSION-TYPE SCREEN AND TRANSMISSION-TYPE SCREEN

(75) Inventors: Futoshi Osawa, Shinjuku-ku (JP); Makoto Honda, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 41 days.

(21) Appl. No.: 10/648,798

(22) Filed: Aug. 27, 2003

(65) Prior Publication Data

US 2004/0160669 A1 Aug. 19, 2004

(30) Foreign Application Priority Data

Aug. 29, 2002 (JP) .............................. 2002-250480

(51) Int. Cl.
*G03B 21/60* (2006.01)
*G03B 21/56* (2006.01)
(52) U.S. Cl. ...................... 359/460; 359/453
(58) Field of Classification Search ................ 359/559, 359/452, 453, 455–457, 460, 619, 628; G03B 21/60, G03B 21/56
See application file for complete search history.

(56) References Cited

U.S. PATENT DOCUMENTS

| | | | | |
|---|---|---|---|---|
| 3,279,314 A | * | 10/1966 | Miller | ........................ 359/453 |
| 5,481,385 A | * | 1/1996 | Zimmerman et al. | ......... 349/62 |
| 5,760,955 A | * | 6/1998 | Goldenberg et al. | ........ 359/456 |
| 6,400,504 B2 | | 6/2002 | Miyata | ....................... 359/453 |
| 6,417,966 B1 | * | 7/2002 | Moshrefzadeh et al. | .... 359/453 |
| 6,727,313 B2 | * | 4/2004 | Zhou et al. | ................. 524/500 |

* cited by examiner

*Primary Examiner*—W. B. Perkey
*Assistant Examiner*—Andrew Sever
(74) *Attorney, Agent, or Firm*—Oliff & Berridge, PLC

(57) ABSTRACT

A diffusion sheet for use in a transmission-type screen comprising a main diffusion layer having an incidence surface and an emergence surface which are parallel to each other. A plurality of groove channels each having a substantially V-shaped cross-section are disposed in parallel on the main diffusion layer. A region sandwiched between the adjacent two groove channels provides a rib with a substantially trapezoidal cross-section. The light substantially perpendicularly incident on the incidence surface is reflected on side surfaces of the rib. An assisting diffusion layer is disposed on the side of the emergence surface of the main diffusion layer, or on both sides of the emergence surface and the incidence surface of the main diffusion layer. The light diffusion component of the assisting diffusion layer is adjusted such that a gain curve of an emergent light from the diffusion sheet has no minimal point.

8 Claims, 6 Drawing Sheets

DIFFUSION SHEET FOR USE IN TRANSMISSION-TYPE SCREEN AND TRANSMISSION-TYPE SCREEN

FIELD OF THE INVENTION

The present invention relates to a diffusion sheet for use in a transmission-type screen and a transmission-type screen using the same.

BACKGROUND OF THE INVENTION

As an example of a transmission-type screen for use in a rear projection-type television, a transmission-type screen including a diffusion sheet and a Fresnel lens sheet has conventionally been known. FIG. 7 is a cross-sectional plan view of a conventional transmission-type screen. In FIG. 7, the reference number 31 indicates a transmission-type screen, 32 indicates a Fresnel lens sheet, and 33 indicates a diffusion sheet.

The Fresnel lens sheet 32 has a concentrically-formed Fresnel lens on the side of its emergence surface. The Fresnel lens has a plurality of concentric Fresnel lens surfaces which are formed oblique with respect to an incidence surface. A cross-section of the Fresnel lens has a saw-tooth appearance.

FIG. 8 is an enlarged cross-sectional view of the diffusion sheet 33. As shown in FIG. 8, the diffusion sheet 33 has a plurality of V-shaped grooves 41 each having a V-shaped cross-section, which are disposed on the side of the emergence surface (upper side in FIG. 8) Each groove 41 is extended in a height direction of the diffusion sheet 33 (in a depth direction of the drawing sheet of FIG. 8). Respective parts sandwiched between the V-shaped grooves 41 form a plurality of ribs 42 each having a trapezoidal cross-section. A side surface 43 of each rib 42 provides an inclined surface of each V-shaped groove 41. A light incident on the side surface 43 is emitted from the diffusion sheet 33 with its advancing direction changed by a reflection at the side surface 43.

The transmission-type screen 31 is positioned such that the Fresnel lens sheet 32 faces a projection device (not shown), and such that the diffusion sheet 33 faces a viewer (not shown). The projection device projects image light toward the transmission-type screen 31, and the viewer observes a projected image on the transmission-type screen 31. At this time, the image light projected by the projection device is inflected by the Fresnel lens surfaces of the Fresnel lens sheet 32, so that the light is adjusted to be in a substantially perpendicular direction to the diffusion sheet 33. The image light adjusted to be in a substantially perpendicular direction is then incident on the side surfaces 43 and top surfaces 44 of the ribs 42. Of this light, the image light incident on the top surfaces 44 of the ribs 42 hardly changes in its advancing direction, and is emitted from the diffusion sheet 33 in a direction substantially perpendicular to the transmission-type screen 31. On the other hand, the image light incident on the side surfaces 43 of the ribs 42 is reflected by the side surfaces 43 to change its advancing direction, and is then inflected by the top surfaces 44 of the ribs 42 to be emitted from the diffusion sheet 33. In this way, some of the image light (image light incident on the side surfaces 43 of the ribs) projected by the projection device is diffused in a width direction of the transmission-type screen 31 to be emitted from the diffusion sheet 33. Thus, the viewer can observe an image with a wide viewing angle in the width direction.

Image light emitted from the conventional transmission-type screen is composed of three groups of light directed in three directions; i.e., a group of light which is directly incident on each top surface 44 of the ribs to be emitted in a perpendicular direction to the transmission-type screen 31; a group of light which is reflected by each side surface 43a on one side of the ribs to be emitted obliquely to the other side of the ribs; and a group of light which is reflected by each side surface 43b on the other side of the ribs to be emitted obliquely to the one side of the ribs. Thus, as shown in FIG. 9, a gain curve of the image light emitted from the transmission-type screen 31 is provided. Herein, the gain curve means a curve formed by plotting ratios of an amount of emergent (outgoing) light to incident light with respect to the respective viewing angles. (Gain is calculated as follows: Light is radiated from the rear side of the screen. An angular distribution of brightness of light emitted forward is measured. An illuminance on the incident surface of the screen and the respective brightness are applied to a relational expression of gain $G = \pi \times$brightness $(cd/m^2)$/illuminance (lux). An illuminance meter such as "ANA-F12 type" manufactured by Sibata Scientific Technology Ltd. may be used, while a luminance meter such as "LS-110" manufactured by Minolta Co., Ltd. may be used.)

As shown in FIG. 9, the gain curve of the transmission-type screen 31 has three peaks, that is, a peak at 0° (perpendicular to the screen), a peak at +25° (inclined 25° rightward to the width direction of the screen), and a peak at −25° (inclined 25° leftward to the width direction of the screen). Thus, an image (spot image) projected on the transmission-type screen 31 is brightly seen when observed from the directions of 0°, +25°, and −25°. However, when observed from other directions, the image seen is extremely dark (or cannot be seen at all). Namely, when the viewer observes an image while moving in the width direction of the transmission-type screen 31, the image is observed in an alternating manner of "bright", "dark", "bright", and so on. This feels strange to the viewer. When a wide image is observed, the viewer also feels strange because of a significant uneven brightness of the center of the image and both ends thereof. In short, the quality of the transmission-type screen is quite low.

SUMMARY OF THE INVENTION

The present invention is made to solve the above disadvantages, and an object thereof is to provide a superior diffusion sheet for a transmission-type screen and a transmission-type screen using the same in which a viewer does not feel strange even when observing an image as the viewing angle changes.

In order to solve such disadvantages, the inventors devoted every effort to research, and they found the following:

1) If a gain curve of image light emitted from a transmission-type screen is adjusted such that the gain curve has no minimal value, a viewer does not feel strange even when observing an image as the viewing angle changes.

2) A gain curve without any minimal value can be obtained by adding an assisting diffusion layer having a light diffusion component only on the side of the emergence surface, or on both sides of the emergence surface and the incident surface of the conventional diffusion sheet. Herein, the assisting diffusion layer has a light diffusion component which diffuses a light at least in the same direction as a direction to which the light is diffused at a side surface of a rib.

An invention recited in claim 1 is a diffusion sheet for use in a transmission-type screen comprising a main diffusion layer having an incidence surface and an emergence surface which are parallel to each other, the main diffusion layer diffusing a light, which is substantially perpendicularly incident on the incidence surface, in a diffusion direction to be emitted from the emergence surface, a plurality of groove channels each having a substantially V-shaped cross-section being disposed in parallel to one another on the emergence surface of the main diffusion layer, each groove channel being formed by two planes, curved surfaces, or bent planes which are joined to each other in the main diffusion layer, a region sandwiched between the adjacent two groove channels providing a rib with a substantially trapezoidal cross-section, while the planes, curved surfaces, or bent planes which form each groove channel providing side surfaces of the rib, the light substantially perpendicularly incident on the incidence surface being reflected on the side surfaces of the rib so that the light is diffused in the diffusion direction, wherein an assisting diffusion layer is disposed on the side of the emergence surface of the main diffusion layer, or on both sides of the emergence surface and the incidence surface of the main diffusion layer, the assisting diffusion layer having a light diffusion component for diffusing a light at least in the same direction as the diffusion direction, and the light diffusion component of the assisting diffusion layer is adjusted such that a gain curve of an emergent light from the diffusion sheet has no minimal point.

According to the present invention, an image light incident on the transmission-type screen is diffused by the assisting diffusion layer as well as the main diffusion layer, so that a gain curve of an emergent light has no minimal point. Thus, even when observing a spot image as the viewing angle changes, the image seen does not extremely change from a "dark" state to a "bright" state, and vice versa. Further, when observing a wide image, the image has a uniform brightness in general, which gives no strange feeling to the viewer. The diffusion direction of the light means a direction in a two dimensional plane which is formed by the width and height directions of the transmission-type screen.

It is preferable that the gain curve has a maximum point at an angle substantially perpendicular to the transmission-type screen (0°). In this way, when observing an image at a front of the transmission-type screen, the image can be observed with a maximum brightness. Preferably, the gain curve has a symmetrical shape in the right and left directions.

It is preferable that a variation of an inclination of the gain curve of the emergent light is adjusted to be equal to or less than 0.1 $(cd/(m^2 \cdot lux))/degree$. When the variation of an inclination of the gain curve of the emergent light is equal to or less than 0.1 $(cd/(m^2 \cdot lux))/degree$, the viewer scarcely realizes the change of the amount of light, i.e., the viewer hardly feels strange.

It is preferable that a substantially transparent resin is filled in the groove channels of the main diffusion layer, the resin having a refractive index lower than that of a material forming the rib. Further, it is preferable that light absorption particles having a light absorbing function are dispersed in the resin. In this way, the outside light incident on the transmission-type screen from the viewer's side is absorbed by the light absorption particles, and thus an image with a clearer contrast can be provided to the viewer. A large part of the side surfaces of each rib is in contact with the transparent resin, and an area of the side surfaces being in contact with the light absorption particles is very narrow.

Thus, when an image light incident on the transmission-type screen is reflected by the side surfaces of each rib, it scarcely occurs that the image light is absorbed in the light absorption particles. Accordingly, the transmission-type screen can maintain a high transmittance, and the viewer can observe a sufficiently bright image.

It is preferable that the light diffusion component of the assisting diffusion layer disposed on the emergence surface of the main diffusion layer is formed of a diffusion material.

In this way, the gain curve can be easily adjusted by adjusting the diffusion material. Thus, a desired diffusion sheet which gives no strange feeling to the viewer can be readily manufactured.

It is preferable that the assisting diffusion layer is further disposed on the incidence surface of the main diffusion layer, and that the light diffusion component of the assisting diffusion layer disposed on the incidence surface of the main diffusion layer is formed of a lenticular lens or prism lens.

In this way, the gain curve can be adjusted by adjusting various parameters of the lenticular lens or prism lens. Thus, a desired diffusion sheet which gives no strange feeling to the viewer can be readily manufactured.

In this way, of the outside light incident from the viewer's side, the outside light which arrives at the lenticular lens or prism lens can enter the side surfaces of each rib at an angle equal to or less than a total reflection critical angle, by being reflected by the lenticular lens or prism lens. When the light absorption particles are disposed in the V-shaped groove channels, the light absorption particles absorb the outside light. Thus, an amount of the outside light reflected to the viewer's side can be reduced, and therefore an image with a clear contrast can be provided.

Further, the present invention is a transmission-type screen comprising a diffusion sheet having any above feature, and a Fresnel lens disposed on the side of the incidence surface of the diffusion sheet.

According to the present invention, an image light projected from a projection device is adjusted to be in a direction substantially perpendicular to the diffusion sheet by means of the Fresnel lens, and thereafter the image light is diffused by the main diffusion layer and the assisting diffusion layer. Since a gain curve of the emergent light has no minimal point, when observing the image projected on the transmission-type screen as the viewing angle changes, the viewer scarcely feels strange because the image does not change from the "dark" state to the "bright" state.

The Fresnel lens may be formed integral with the side of an incidence surface of a diffusion sheet. Alternatively, the Fresnel lens may be formed as a Fresnel lens sheet which is separate from the diffusion sheet.

DETAILED DESCRIPTION OF THE INVENTION

A preferred embodiment of a transmission-type screen according to the present invention is described below with reference to the accompanied drawings.

Figure 1:
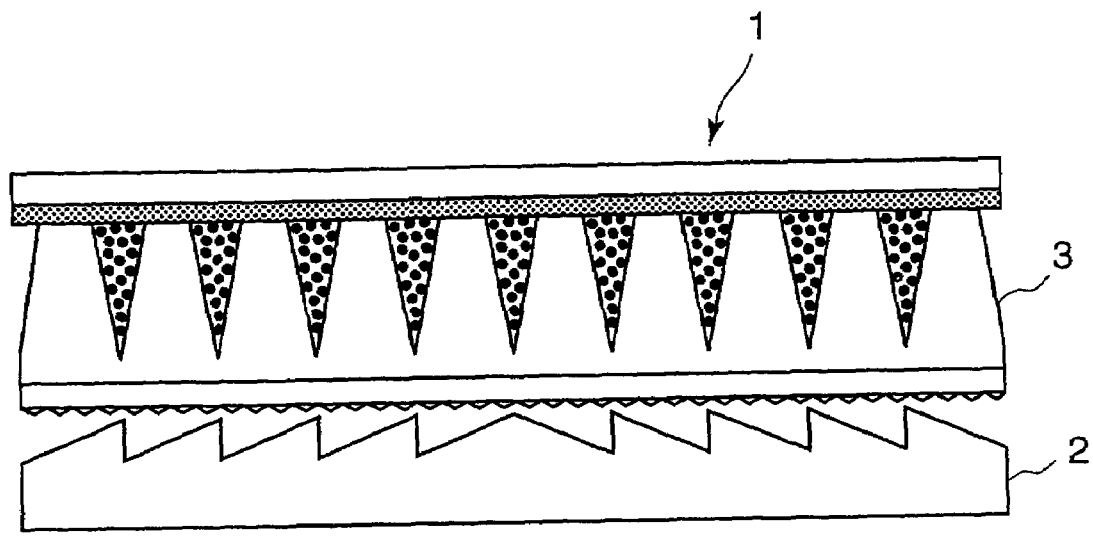
FIG. 1 is a cross-sectional view showing a structure of a transmission-type screen according to an embodiment of the present invention.

FIG. 1 is a cross-sectional view showing a transmission-type screen of the embodiment. As shown in FIG. 1, a transmission-type screen 1 includes a Fresnel lens sheet 2 and a diffusion sheet 3 which overlap each other.

The Fresnel lens sheet 2 has a concentrically-formed Fresnel lens on the side of its emergence surface. The Fresnel lens has a plurality of concentric Fresnel lens surfaces which are formed oblique with respect to an incidence surface. A cross-section of the Fresnel lens has a saw-tooth appearance. The thus formed Fresnel lens sheet 2 inflects an image light projected from a projection device (not shown) by the Fresnel lens surfaces to adjust the light to be substantially perpendicular to the diffusion sheet 3, so that the light is emitted from the Fresnel lens sheet 2. In place of the inflection-type Fresnel lens sheet which inflects an image light by the Fresnel lens surfaces to adjust the light to be substantially perpendicular, a reflection-type Fresnel lens sheet which reflects an image light to adjust the light to be substantially perpendicular may be used.

Figure 2:
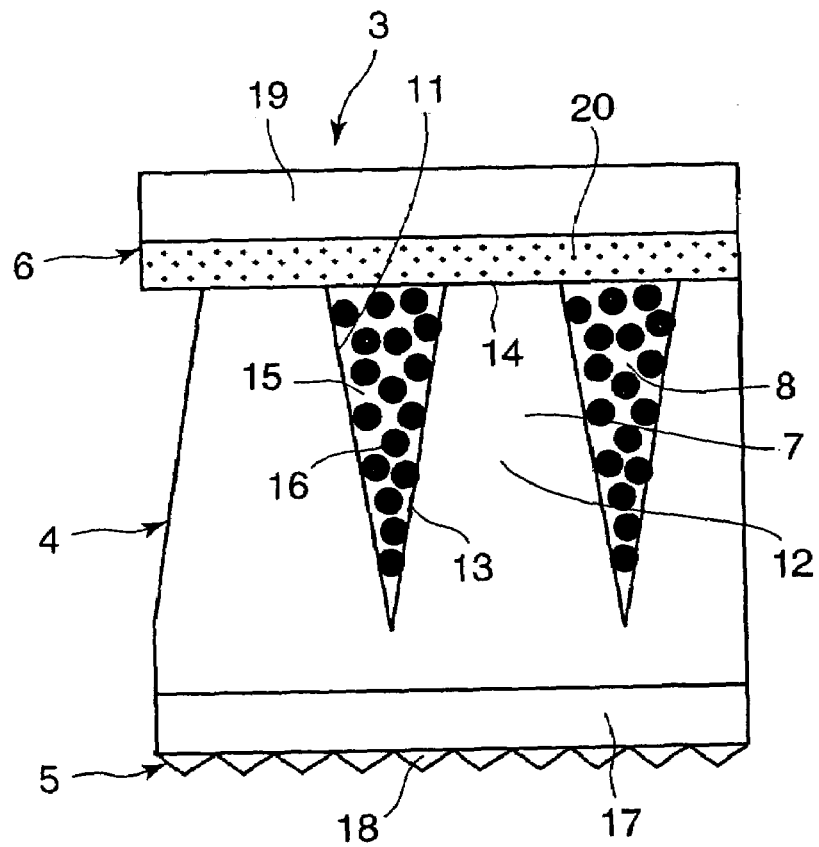
FIG. 2 is a cross-sectional view showing a structure of a diffusion sheet according to an embodiment of the present invention.

FIG. 2 is a cross-sectional view of the diffusion sheet 3. As shown in FIG. 2, the diffusion sheet 3 is composed of a first diffusion layer 4, a second diffusion layer 5, a third diffusion layer 6, and a base material 17. The first diffusion layer 4 constitutes a main diffusion layer, and the second diffusion layer 5 and the third diffusion layer 6 constitute assisting diffusion layers.

The first diffusion layer 4 is composed of a light transmission layer 7 and a light absorption layer 8. The light transmission layer 7 is formed of a first light transmitting resin. The light transmission layer 7 has a plurality of V-shaped grooves 11 each having a V-shaped cross-section, which are disposed on the side of the emergence surface (upper side in FIG. 2). Each groove 11 is extended in a height direction of the diffusion sheet 3 (in a depth direction of the drawing of FIG. 2). Respective parts sandwiched between the V-shaped grooves 11 form a plurality of ribs 12 each having a trapezoidal cross-section. Each rib 12 has side surfaces 13 and a top surface 14. The side surfaces 13 provide inclined surfaces of each V-shaped groove 11. An image light incident on the side surfaces 13 is reflected by the side surfaces 13 to change its advancing direction, and is diffused in a width direction of the diffusion sheet 3 to be emitted therefrom.

The light absorption layer 8 is so formed as to fill the V-shaped grooves 11. The light absorption layer 8 is formed of a base layer 15 and light absorption particles 16 having a light absorbing function which are dispersed in the base layer 15. The base layer 15 is formed of a second light transmitting resin having a refractive index smaller than that of the first light transmitting resin. The light absorption particles 16 absorb an outside light incident from the side of the emergence surface to reduce an amount of the outside light which is reflected to the viewer's side. A large part of the side surfaces 13 of each rib 12 is in contact with the base layer 15, and an area of the side surfaces 13 being in contact with the light absorption particles 16 is very narrow. Thus, when an image light incident on the diffusion sheet 3 is reflected by the side surfaces 13 of each rib 12, it is rare that the image light is absorbed in the light absorption particles 16.

As a first light transmitting resin forming the light transmission layer 7, an acrylate-based resin, which becomes solid by an ionization radiation or a thermal energy, may be used by way of example. As a second light transmitting resin forming the base layer 15 of the light absorption layer 8, a resin of the same kind (but not the same one) as the first light transmitting resin, or an acrylate-based resin having a low refractive index to which silicon or fluorine is introduced, may be used by way of example. Each light absorption particle 16 is formed of a pigment such as carbon; a mixed colorant including a plurality of dye stuffs such as red, blue, yellow, and black ones; or an acryl-based cross-link particle colored by the above pigment and/or colorant.

The second diffusion layer 5 is formed of a plurality of prism lenses 18 which are successively disposed on the side of the incidence surface of the first diffusion layer 4, and are extended in a height direction of the diffusion sheet 3 (in a depth direction of the drawing of FIG. 2). Each prism lens 18 inflects an image light incident from the side of the incidence surface by a prism surface which is obliquely formed with respect to a width direction of the diffusion sheet 3, so as to diffuse the image light in the width direction of the diffusion sheet 3. That is, the direction to which the image light is diffused by the second diffusion layer 5 is the same direction (the width direction of the diffusion sheet 3) to which the image light is diffused by the first diffusion layer 4.

Of the outside light incident from the viewer's side, each prism lens 18 reflects the outside light which arrives thereat. A part of, or all of the reflected light is incident on the side surfaces 13 of the ribs 12 at an angle equal to or less than a total reflection critical angle, and is then absorbed in the light absorption particles 16 in the V-shaped grooves 11. In this way, an amount of the outside light reflected to the viewer's side is reduced, and thus an image of a clearer contrast can be provided.

The third diffusion layer 6 is disposed on the side of the emergence surface of the first diffusion layer 4. The third diffusion layer 6 is composed of a light transmitting resin layer 19 and a diffusion material layer 20 disposed on the side of the first diffusion layer 4 of the resin layer 19. The diffusion material layer 20 has a diffusion material dispersed in a resin forming the resin layer 19. The diffusion material is a resin that has a refraction index different from that of the light transmitting resin forming the layer 19, and has a substantially spherical shape, for example. Thus, an image light incident on the diffusion material layer 20 is refracted by the diffusion material layer 20 to be diffused in the height and width directions of the diffusion sheet 3. That is, the directions to which an image light is diffused by the third diffusion layer 6 include the direction (the width direction of the diffusion sheet 3) to which an image light is diffused by the first diffusion layer 4. The diffusion material is formed, e.g., of an MS-based resin (styrene-acryl-based resin). The diffusion material may generally be dispersed in a thickness direction of the third diffusion layer 6. Either form may be optionally selected according to a design of a television. In general, for an industrial use wherein a reflection of an outside light is undesirable, it is preferable that the diffusion material is generally dispersed in the thickness direction of the third diffusion layer 6. In this constitution, since the diffusion material is positioned on a surface of the viewer's side of the third diffusion layer 6, the surface is made matte so that an outside light reflection is reduced. On the other hand, for a household use such as CRTTV, since a surface of the viewer's side preferably has a mirror finish, it is preferable that the layer (19) in which the diffusion material is not dispersed is disposed in the third diffusion layer, as with the embodiment, so as to make the side of the emergence surface more transparent.

Herein, each prism lens 18 as a light diffusion component of the second diffusion layer 5 and the diffusion material layer 20 as a light diffusion component of the third diffusion layer 6 are suitably adjusted such that a gain curve of the emergent light of the diffusion sheet 3 has no minimal point. More preferably, a variation of an inclination of the gain curve is adjusted to be equal to or less than 0.1/degree.

Figure 3:
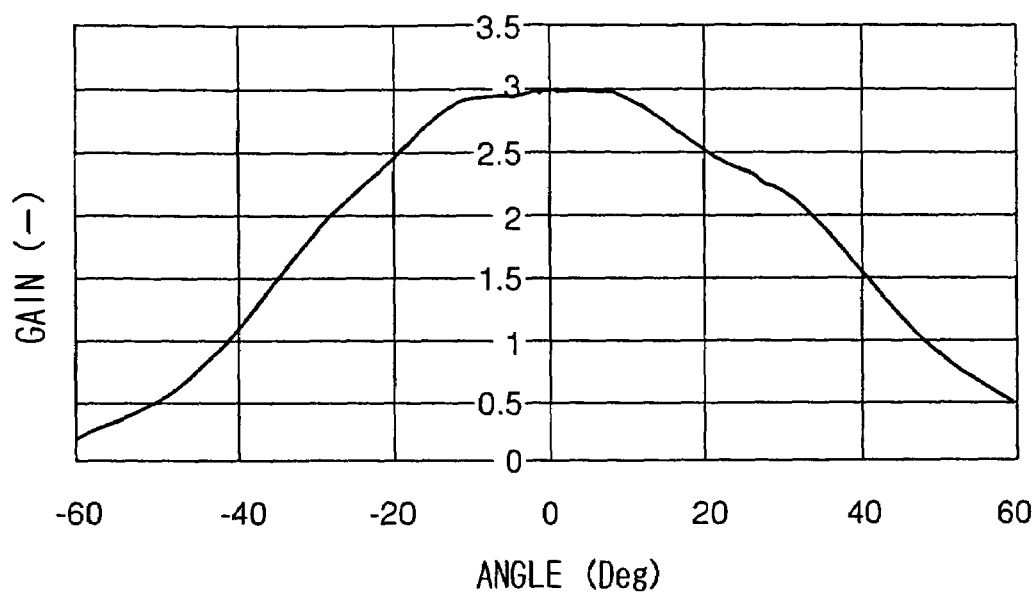
FIG. 3 is a graph showing a gain curve of an emergent light from the transmission-type screen shown in FIG. 1.

Namely, a diffusion sheet 3 which can provide a gain curve, e.g., shown in FIG. 3 is formed by adjusting each prism lens 18 and the diffusion material layer 20. In the gain curve shown in FIG. 3, there is a maximum point at a viewing angle of 0°. A gain value is gradually decreased as the viewing angle is increased in the plus and minus directions. There is no minimal point at least in a range of from −60° to 60° of the observation angle. A variation of an inclination of the gain curve is equal to or less than 0.1/degree.

In a case wherein an image light is projected from a projection device to the side of the incidence surface of the transmission-type screen 1 thus constituted, when a viewer on the side of the emergence surface observes the image, he or she does not feel strange even when moving in the width direction of the transmission-type screen 1.

In the above embodiment, the assisting diffusion layers are disposed on both sides of the incidence surface and the emergence surface of the main diffusion layer (the first diffusion layer 4 in the above embodiment). However, not limited thereto, the assisting layer may be disposed only on the side of the emergence surface. For example, the second diffusion layer 5 may be eliminated from the diffusion sheet 3 shown in FIG. 2 to form another diffusion sheet.

Figure 4:
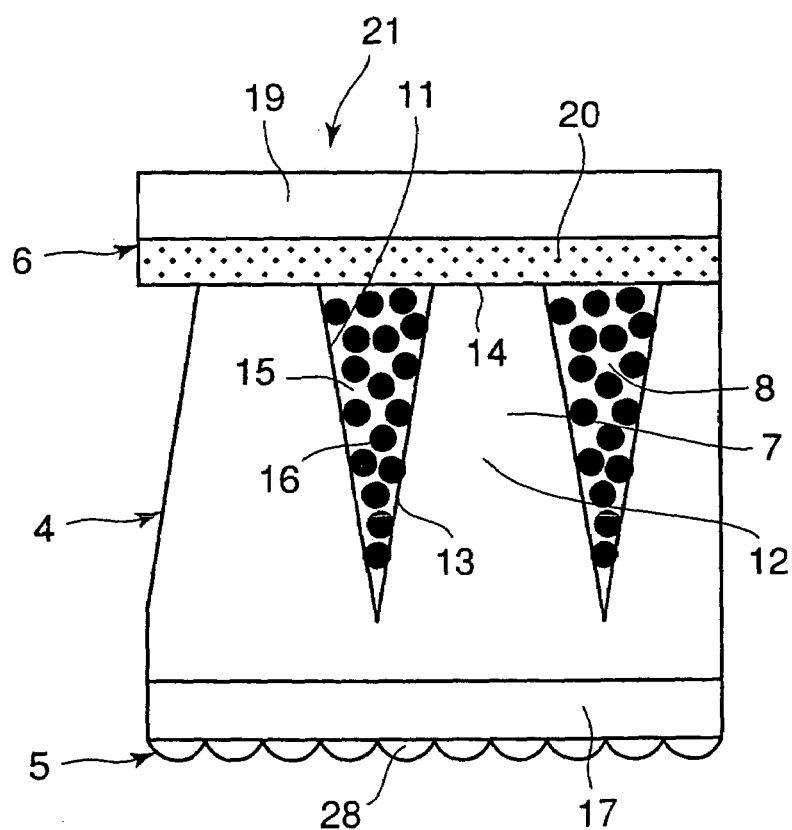
FIG. 4 is a cross-sectional view showing a structure of a diffusion sheet according to another embodiment of the present invention.

In the above embodiment, although the prism lenses 18 are used as a light diffusion component of the second diffusion layer 5, lenticular lenses may be used in place of the prism lenses 18. FIG. 4 shows an example of a diffusion sheet in which lenticular lenses are employed. A diffusion sheet 21 shown in FIG. 4 has lenticular lenses 28 in place of the prism lenses 18 of the diffusion sheet 3 shown in FIG. 2. Since other parts have the same structure and function as those of the diffusion sheet 3 shown in FIG. 2, they have the same reference numbers in FIG. 4.

The lenticular lenses 28 are formed of a plurality of columnar lenses which are successively disposed on the side of the incidence surface of the first diffusion layer 4. The lenses are extended in a height direction of the diffusion sheet 3 (in a depth direction of the drawing of FIG. 4). Each lenticular lens 28 thus constituted refracts an image light incident from the side of the incidence surface by means of a spherical lens surface to diffuse the image light in the width direction of the diffusion sheet 3. In this case, a gain curve is adjusted by adjusting various parameters of each lenticular lens 28.

In the above embodiments, each V-shaped groove 11 of the first diffusion layer 4 is formed to extend in a height direction of the diffusion sheet 3 (21). However, not limited thereto, each V-shaped groove 11 may be formed to extend in a width direction of the diffusion sheet 3 (21), for example. Further, a V-shaped groove extending in the height direction of the diffusion sheet 3 (21) and a V-shaped groove extending in the width direction thereof may be combined to form or position them in a lattice-like manner. In the first case, each prism lens 18 or lenticular lens 28 of the second diffusion layer 5 may be formed or positioned to extend in the width direction of the diffusion sheet 3 (21), corresponding to the extending direction of each V-shaped groove 11. In the second case, each prism lens 18 or lenticular lens 28 of the second diffusion layer 5 may be formed or positioned in a lattice-like manner in the height and width directions of the diffusion sheet 3 (21), corresponding to the extending directions of the V-shaped grooves 11.

Figure 5:
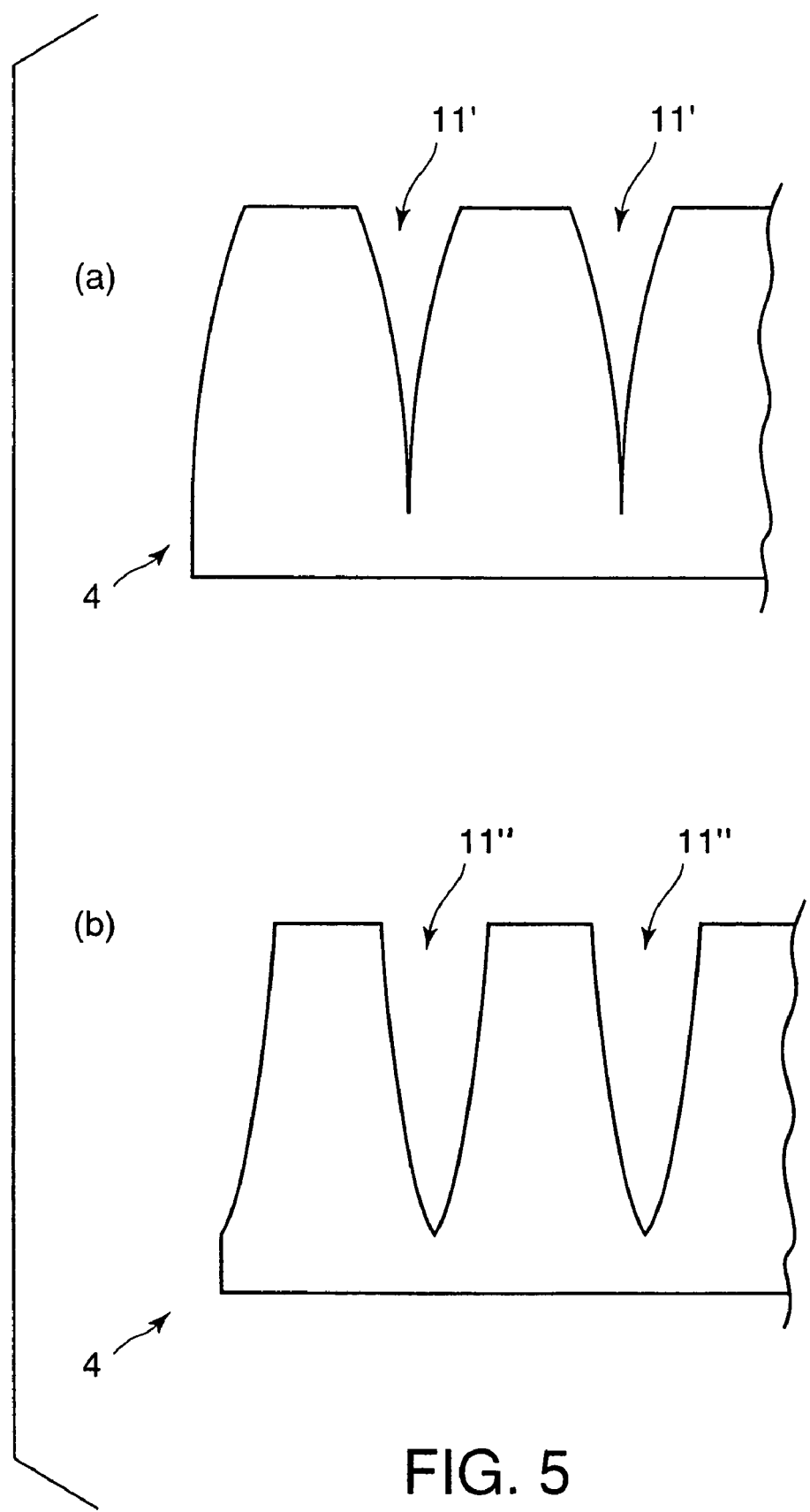
FIG. 5 is a cross-sectional view showing an example of a groove with a substantially V-shaped cross-section.

Not limited to a V-shaped groove defined by two planes in the strict sense, each V-shaped groove 11 may be defined by two curved surfaces each having a relatively large radius of curvature. FIGS. 5(a) and 5(b) show examples thereof. FIG. 5(a) is a cross-sectional view of a substantially V-shaped groove 11' formed by two curved surfaces which are convexly curved with respect to the side of the emergence surface. FIG. 5(b) is a cross-sectional view of a substantially V-shaped groove 11" formed by two curved surfaces which are concavely curved with respect to the side of the emergence surface. The substantially V-shaped groove 11' or 11" may be substituted for the V-shaped groove 11.

Figure 6:
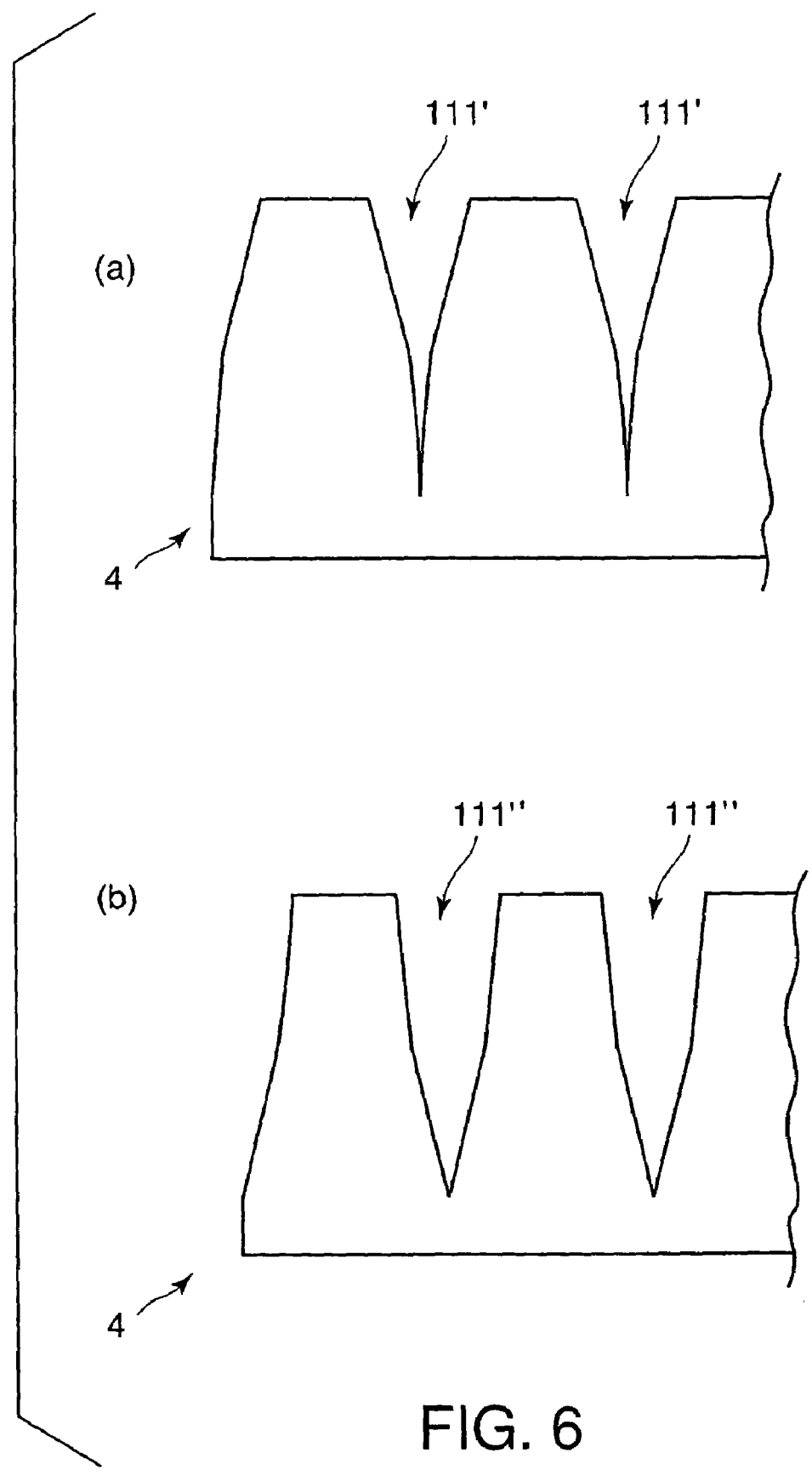
FIG. 6 is a cross-sectional view showing another example of a groove with a substantially V-shaped cross-section.
Figure 7:
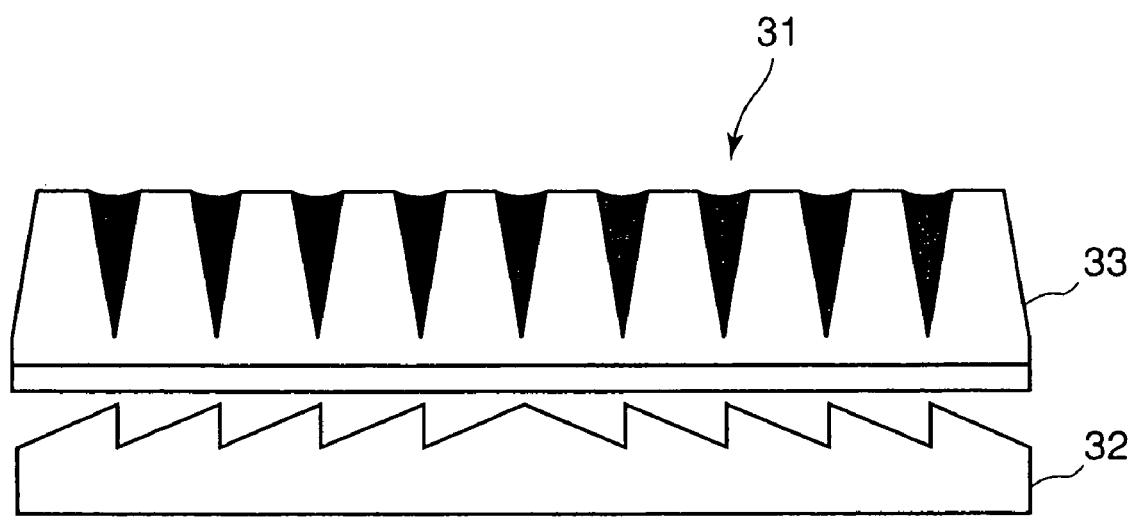
FIG. 7 is a cross-sectional view showing an example of a structure of a conventional transmission-type screen.
Figure 8:
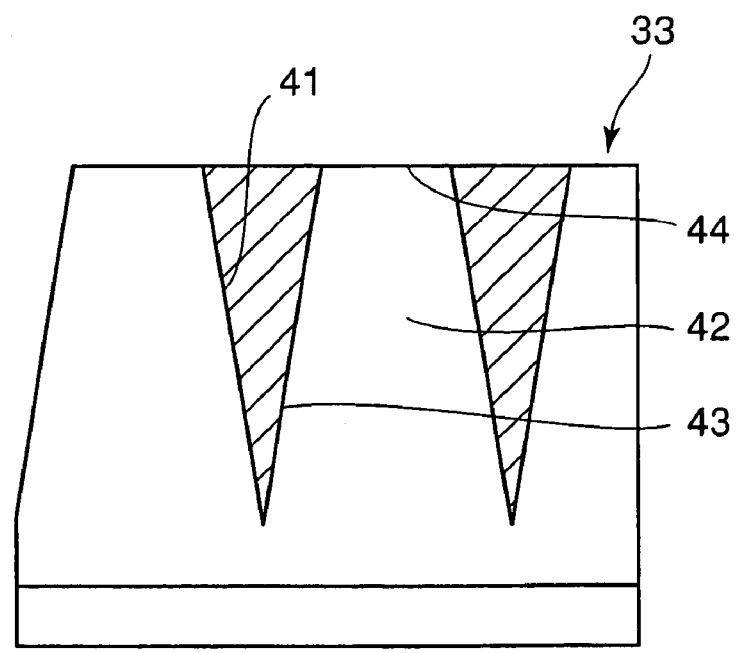
FIG. 8 is a cross-sectional view showing an example of a structure of a conventional diffusion sheet.
Figure 9:
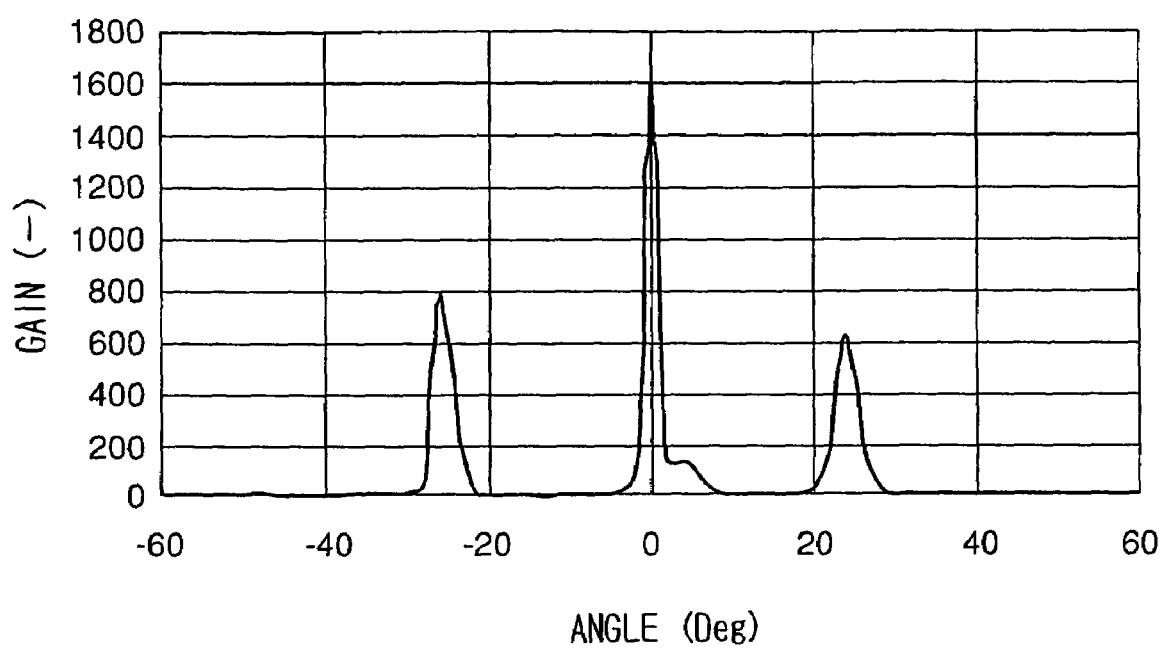
FIG. 9 is a graph showing a gain curve of an emergent light from the conventional transmission-type screen shown in FIG. 7.

Alternatively, each V-shaped groove 11 may be defined by two bent planes each being bent at a relatively small angle. FIGS. 6(a) and 6(b) show examples thereof. FIG. 6(a) is a cross-sectional view of a substantially V-shaped groove 111' formed by two bent surfaces which are convexly bent with respect to the side of the emergence surface. FIG. 6(b) is a cross-sectional view of a substantially V-shaped groove 111" formed by two bent surfaces which are concavely bent with respect to the side of the emergence surface. The substantially V-shaped groove 111' or 111" may be substituted for the V-shaped groove 11. The bending number of each bent surface (the number of bending lines) may be two or more. Conceptually, a plane which is bent infinite times corresponds to the curved surface shown in the respective FIGS. 5(a) and 5(b).

EXAMPLE 1

In order to obtain a gain curve shown in FIG. 3, a transmission-type screen was formed as described below. As shown in FIG. 2, the transmission-type screen was formed by a diffusion sheet and a Fresnel lens sheet.

The Fresnel lens sheet was formed by concentrically positioning a plurality of Fresnel lenses at a pitch of 0.1 mm.

The diffusion sheet was composed of a first diffusion layer, a second diffusion layer, a third diffusion layer, and a base material. A light transmission layer as the first diffusion layer was formed of an acryl-based resin of an ionization-radiation-cure type. A plurality of V-shaped grooves and ribs were formed on the side of an emergence surface of the first diffusion layer. Each V-shaped groove was 150 $\mu$m in width and 250 $\mu$m in depth. A top width of each rib was 75 $\mu$m, and each side surface thereof was inclined at an angle 8°. Each V-shaped groove was filled with a light absorption layer in which spherical light absorption particles were dispersed in a base layer of a silicon-acrylate-based resin of an ionization-radiation-cure type. The light absorption particles were 10 $\mu$m in diameter, and were black by carbon-coloring. A total thickness of the first diffusion layer was 300 $\mu$m.

The second diffusion layer was formed by disposing a plurality of prism lenses each having an isosceles triangular cross-section of 150° in top angle and 3 µm in height.

The third diffusion layer was formed of a sheet made of acryl having a thickness of 2 mm. A diffusion material layer was formed by dispersing an MS-based diffusion material at a portion of 0.8 mm on the side of the first diffusion layer. The third diffusion layer was formed to have a haze value of 80%.

In the transmission-type screen thus formed, a gain curve of an emergence light had no minimal point, and a variation of an inclination of the gain curve was equal to or less than 0.1/degree. Hence, even when observing the screen as the viewing angle changes, the viewer did not feel strange because no complicated gain change occurred.

Since an outside light incident from the viewer's side was absorbed by the light absorption particles in the light absorption layer, an image of a clear contrast could be provided to the viewer. A part of the outside light which was not absorbed in the light absorption particles was reflected by prism lenses to enter the side surfaces of the ribs. At this time, since the outside light, which was incident on the side surfaces of the ribs at an angle equal to or less than a total reflection critical angle, entered the light absorption layer to be absorbed in the light absorption particles, an image of a much clearer contrast was provided.

Since the light absorption layer was formed by dispersing the light absorption particles in the base layer, the image light was scarcely absorbed in the light absorption particles when being reflected by the side surfaces of the ribs. Accordingly, a loss of the image light could be minimally restrained.

What is claimed is:

1. A diffusion sheet for use in a transmission-type screen, the diffusion sheet comprising:
    a main diffusion layer having an incidence surface and an emergence surface that are parallel to each other; and
    an assisting diffusion layer provided at least on an emergence surface-side of the main diffusion layer;
    wherein:
    the main diffusion layer is provided with a plurality of substantially parallel groove channels in the emergence surface extending along the main diffusion layer in a vertical direction;
    each of the groove channels has a substantially V-shaped cross-section defined by a first side wall and a second side wall that extend into the emergence surface and intersect within the main diffusion layer, each of the first side walls and the second side walls having a shape selected from planes, curved surfaces, or bent planes;
    the main diffusion layer is provided with a plurality ribs separating the plurality of groove channels;
    each of the ribs has a substantially trapezoidal cross-section defined by the emergence surface, the first side wall of an adjacent groove channel, and the second side wall of another adjacent groove channel;
    light substantially perpendicularly incident on the incidence surface is reflected by the first and second side walls so that the light is diffused in a diffusion direction;
    the assisting diffusion layer comprises a light diffusion component that diffuses light at least in the diffusion direction; and
    the light diffusion component of the assisting diffusion layer is selected so that a gain curve for light emergent from the diffusion sheet at horizontal viewing angles has no minimal point.

2. A diffusion sheet according to claim 1, wherein the gain curve for light emergent from the diffusion sheet has a variation of inclination of 0.1 (cd/(m²·lux))/degree or less.

3. A diffusion sheet according to claim 1, wherein the groove channels are filled with
    a substantially transparent resin having a lower refractive index than a material forming the ribs.

4. A diffusion sheet according to claim 3, wherein light absorption particles having a light absorbing function are dispersed in the resin.

5. A diffusion sheet according to claim 1, wherein the light diffusion component of the assisting diffusion layer is formed of a diffusion material.

6. A diffusion sheet according to claim 1,
    further comprising a second assisting diffusion layer provided on an incidence surface-side of the main diffusion layer; wherein:
    a second light diffusion component of the second assisting diffusion layer comprises a lenticular lens.

7. A diffusion sheet according to claim 1,
    further comprising a second assisting diffusion layer provided on an incidence surface-side of the main diffusion layer; wherein:
    a second light diffusion component of the second assisting diffusion layer comprises a prism lens.

8. A transmission-type screen, comprising:
    a diffusion sheet for use in a transmission-type screen; and
    a Fresnel lens provided on a side of the diffusion sheet to which light is incident during operation;
    wherein:
    the diffusion sheet comprises:
        a main diffusion layer having an incidence surface and an emergence surface that are parallel to each other; and
        an assisting diffusion layer provided at least on an emergence surface-side of the main diffusion layer;
    wherein:
        the main diffusion layer is provided with a plurality of substantially parallel groove channels in the emergence surface extending along the main diffusion layer in a vertical direction;
        each of the groove channels has a substantially V-shaped cross-section defined by a first side wall and a second side wall that extend into the emergence surface and intersect within the main diffusion layer, each of the first side walls and the second side walls having a shape selected from planes, curved surfaces, or bent planes;
        the main diffusion layer is provided with a plurality of ribs separating the plurality of groove channels;
        each of the ribs has a substantially trapezoidal cross-section defined by the emergence surface, the first side wall of an adjacent groove channel, and the second side wall of another adjacent groove channel;
        light substantially perpendicularly incident on the incidence surface is reflected by the first and second side walls so that the light is diffused in a diffusion direction;
        the assisting diffusion layer comprises a light diffusion component that diffuses light at least in the diffusion direction; and
        the light diffusion component of the assisting diffusion layer is selected so that a gain curve for light emergent from the diffusion sheet at horizontal viewing angles has no minimal point.

* * * * *